US012158023B2

(12) United States Patent
Uyeda et al.

(10) Patent No.: US 12,158,023 B2
(45) Date of Patent: Dec. 3, 2024

(54) LOCKING ASSEMBLY WITH SPRING MECHANISM

(71) Applicant: ASSA ABLOY Americas Residential Inc., New Haven, CT (US)

(72) Inventors: Alan Uyeda, Irvine, CA (US); James Lin, Laguna Niguel, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 18/130,516

(22) Filed: Apr. 4, 2023

(65) Prior Publication Data

US 2023/0323705 A1 Oct. 12, 2023

Related U.S. Application Data

(63) Continuation of application No. 16/565,860, filed on Sep. 10, 2019, now Pat. No. 11,643,845.

(Continued)

(51) Int. Cl.

*E05B 49/00* (2006.01)
*E05B 27/00* (2006.01)

(Continued)

(52) U.S. Cl.

CPC .......... *E05B 49/00* (2013.01); *E05B 27/0003* (2013.01); *E05B 47/0012* (2013.01); *E05B 47/026* (2013.01)

(58) Field of Classification Search

CPC .. E05B 49/00; E05B 27/0003; E05B 47/0012; E05B 47/026; E05B 47/0692; E05B 47/0676; E05B 47/0684; E05B 47/0688; E05B 2047/0026; E05B 2047/0028; Y10T 70/5416; Y10T 70/5496; Y10T 70/5805; Y10T 70/5823; Y10T 70/5827; Y10T 70/5832; Y10T 70/5673;

(Continued)

(56) References Cited

U.S. PATENT DOCUMENTS 4,429,556 A 2/1984 Kambic
4,633,687 A 1/1987 Fane (Continued)

FOREIGN PATENT DOCUMENTS

CN 2248755 3/1997
CN 1323371 11/2001

(Continued)

OTHER PUBLICATIONS

An English language translation of Chinese Office Action, dated Jan. 6, 2022, for CN patent application No. CN 201980066798.0 (19 pages).

(Continued)

*Primary Examiner* — Christine M Mills
*Assistant Examiner* — Yahya Sidky
(74) *Attorney, Agent, or Firm* — Merchant & Gould P.C.

(57) ABSTRACT

An electronic lock with a latch assembly, an interior assembly, and an exterior assembly. The latch assembly includes a bolt movable between an extended position and a retracted position. The assembly includes an internal spring actuating mechanism. The assembly also includes a touch keypad subassembly configured to detect touches to at least a portion of its surface.

20 Claims, 14 Drawing Sheets

Related U.S. Application Data

(60) Provisional application No. 62/815,703, filed on Mar. 8, 2019, provisional application No. 62/729,112, filed on Sep. 10, 2018.

(51) Int. Cl.
*E05B 47/00* (2006.01)
*E05B 47/02* (2006.01)

(58) Field of Classification Search
CPC ............. Y10T 70/5677; Y10T 70/7949; Y10T 70/7062; Y10T 70/7102; Y10T 70/7107; Y10T 70/7113; Y10T 70/713
See application file for complete search history.

(56) References Cited

U.S. PATENT DOCUMENTS

| | | | | |
|---|---|---|---|---|
| 5,475,996 | A | 12/1995 | Chen | |
| 6,067,823 | A | 5/2000 | Ostergren | |
| 6,145,353 | A | 11/2000 | Doucet | |
| 6,286,347 | B1 | 9/2001 | Frolov | |
| 7,188,495 | B2 | 3/2007 | Errani et al. | |
| 7,195,295 | B2 | 3/2007 | Huang | |
| 7,559,219 | B2 * | 7/2009 | Chen | E05B 65/1086 292/336.3 |
| 8,272,241 | B2 * | 9/2012 | Brown | G07C 9/00896 292/357 |
| 8,939,477 | B2 * | 1/2015 | Welsby | E05B 55/005 292/347 |
| 9,562,370 | B2 | 2/2017 | Ohl et al. | |
| 10,370,870 | B2 | 8/2019 | Ohl et al. | |
| 11,643,845 | B2 | 5/2023 | Uyeda | |
| 2003/0019256 | A1 | 1/2003 | Frolov | |
| 2005/0050928 | A1 | 3/2005 | Frolov | |
| 2005/0086984 | A1 | 4/2005 | Errani et al. | |
| 2006/0021404 | A1 | 2/2006 | Menta San Miguel | |
| 2008/0011030 | A1 * | 1/2008 | Ferreira Sanchez | E05B 47/0692 70/223 |
| 2009/0249846 | A1 | 10/2009 | Gokcebay | |
| 2010/0212373 | A1 | 8/2010 | Wheeler | |
| 2011/0079057 | A1 * | 4/2011 | Frolov | E05B 47/0673 70/91 |
| 2016/0083978 | A1 * | 3/2016 | Dayanikli | E05B 47/0012 70/85 |
| 2019/0040655 | A1 | 2/2019 | Chang | |

FOREIGN PATENT DOCUMENTS

| | | |
|---|---|---|
| CN | 103306538 | 9/2013 |
| CN | 107429522 | 12/2017 |
| CN | 108222680 | 6/2018 |
| DE | 20 2015 102 071 | 7/2015 |
| KR | 10-1638648 | 7/2016 |
| KR | 101755226 B1 * | 7/2017 |
| WO | 2015/097719 | 7/2015 |

OTHER PUBLICATIONS

PCT International Preliminary Report on Patentability in Application PCT/US2019/050392, mailed Mar. 25, 2021, 10 pages.
PCT International Search Report and Written Opinion for Application No. PCT/US2019/050392 mailed Jan. 10, 2020.
Taiwan Office Action and Search Report in Application 108132630, mailed Dec. 30, 2022, 16 pages.

* cited by examiner

LOCKING ASSEMBLY WITH SPRING MECHANISM

CROSS REFERENCE TO RELATED APPLICATIONS

This application is a continuation of U.S. patent application Ser. No. 16/565,860, filed Sep. 10, 2019, now U.S. Pat. No. 11,643,845, which claims priority to U.S. Provisional Application Ser. No. 62/815,703 filed on Mar. 8, 2019; and 62/729,112 filed on Sep. 10, 2018, the entire contents of which are hereby expressly incorporated herein by reference.

TECHNICAL FIELD

This invention relates to the field of door locks. More particularly, this invention relates to internal mechanisms of a locking assembly.

BACKGROUND

Door locks are commonly installed in residential and commercial settings. There are many different types of door locks used throughout residential and commercial settings as well. Door locks are already routinely used to simply lock a door. As technology progresses, there has been a growing trend to improve door locks by adding electronics thereby allowing a user to unlock a door without a traditional key.

When designing and manufacturing electronic lock housings, chassis are often required to house the electronics. As technology progresses, the electronic components increase in size and complexity, but increasing the size of the lock is not desirable. In electronic deadbolts, the latch's hub is typically driven by a motor. In addition, the lock houses a transmission, clutch, and preload device. Traditional transmissions have gears that are driven by the motor. However, having multiple components provides more opportunity for components to break or malfunction. What is therefore needed is an improved transmission, clutch, and preload device.

SUMMARY

In general terms, this disclosure is directed towards a locking assembly for use on internal and external doors. This disclosure relates generally to an electronic lock with or without a traditional lock cylinder. The electronic lock includes an internal spring actuated mechanism.

In a first aspect, a locking assembly is described. The locking assembly comprises a motor, spindle, barrel, and flange. The spindle is actuatable by the motor and is positioned to rotate around a first axis in response to actuation of the motor. The spindle includes a lateral projection that engages a first spring such that, upon rotation of the spindle, a position of the first spring changes relative to the lateral projection along the first axis between a neutral position and a biasing position. The barrel has a recess operatively engageable by a pin movable between an engaged position in which the pin resides within the recess and a disengaged position in which the pin remains outside the recess. The pin is biased toward the disengaged position by the second spring, and the barrel is rotatable around a second axis perpendicular to the first axis by an actuator. The flange at least partially surrounds the barrel, the pin, and the second spring. The flange is engageable by the first spring at least when the first spring is in a biasing position. The flange is movable between a first position and a second position, wherein the flange remains in the first portion when the first spring is in the neutral position and wherein the flange is biased toward the second position when the first spring is in the biasing position. Biasing the flange toward the second position urges the pin toward the engaged position.

In another embodiment, a locking assembly for use on a door separating an exterior space from a secured space is described. The locking assembly includes a means for rotating a spindle around a first axis, and the spindle includes a first engagement means. A second engagement means is engaged with the first engagement means, and the second engagement means is moved along the first axis from a first position to a second position. Moving the second engagement means to the second position causes a third engagement means to be biased toward a fourth engagement means. When the fourth engagement means is biased, it is in position to engage a means for latching. In response to rotation, a means for rotating engages the fourth engagement means and retracts a latch.

In yet another aspect, a method for operating a locking assembly is described. The method comprises: in response to receiving an input, actuating a motor from a control circuit to rotate a spindle around a first axis. The spindle includes an engagement that engages a first spring to move the first spring relative to the lateral projection along the first axis from a neutral position to a biasing position. Movement of the first spring to the biasing position biases a movable flange toward a second position from a first position. Biasing the movable flange toward the second position biases a pin toward a recess in a barrel to position the pin for engagement of a latch. In response to rotation of an actuator, the pin is engaged with the latch and retracts the latch.

Corresponding reference characters indicate corresponding parts throughout the several views. The exemplifications set out herein illustrate an embodiment of the invention, and such exemplifications are not to be construed as limiting the scope of the invention in any manner.

BRIEF DESCRIPTION OF THE DRAWINGS

The present disclosure will be described hereafter with reference to the attached drawings which are given as non-limiting examples only, in which.

DETAILED DESCRIPTION

Figure 1:
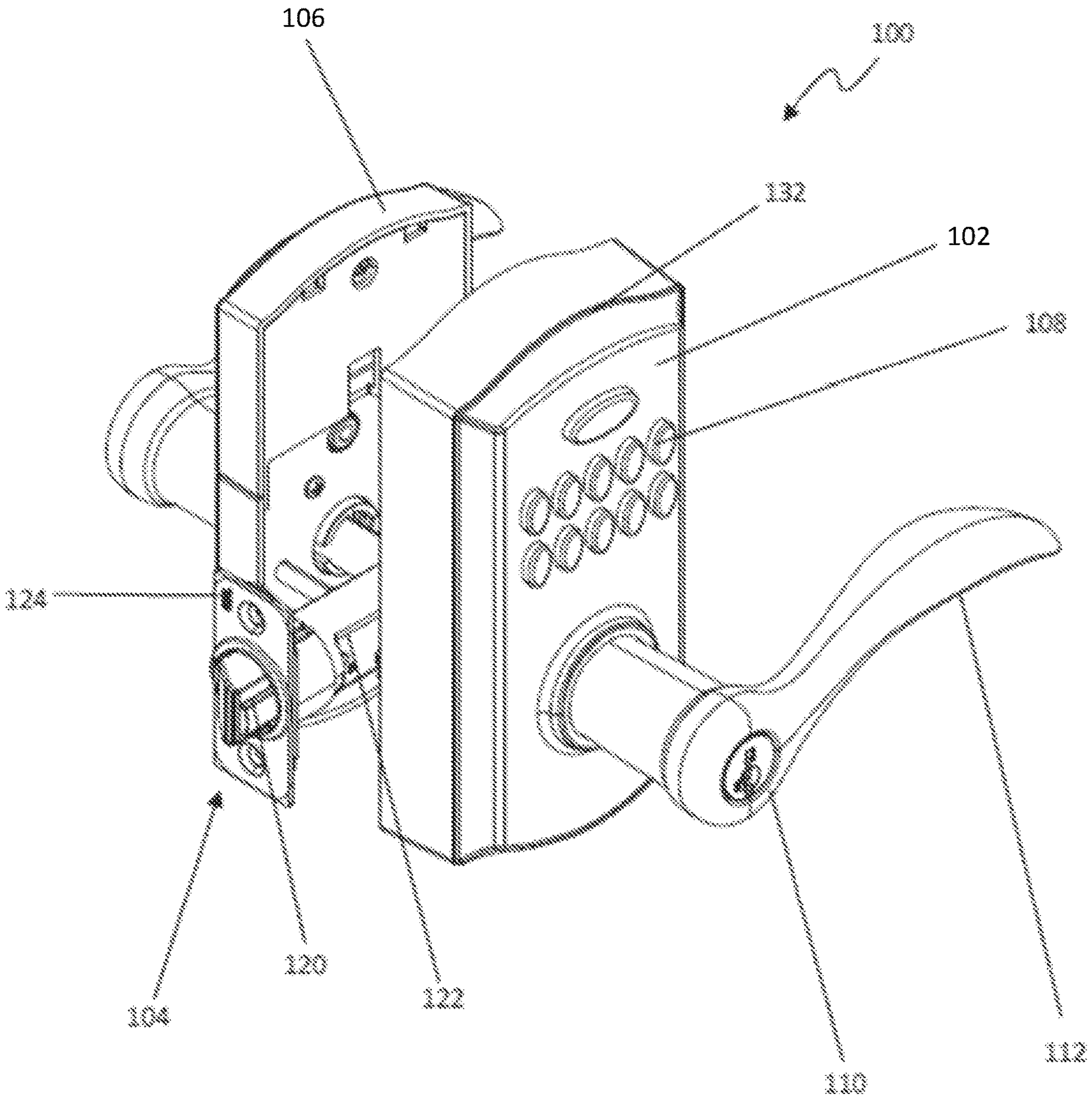
FIG. 1 shows a perspective view of an exterior portion of the locking assembly.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

This disclosure relates generally to an electronic lock without a traditional clutch and transmission assembly. The electronic lock includes an internal spring actuated mechanism. Unlike existing locks, which include a transmission, clutch, and a preload device, the electronic lock as disclosed does not require any of these features and instead includes a motor and a single spring mechanism. Further, unlike existing door handles and locking mechanisms, embodiments herein describe a lock that can be opened regardless of whether the external lever has been actuated first or second (before or after entering an electronic passcode).

FIG. 1 shows a locking assembly 100 according to one embodiment of the disclosure, for example an electronic locking assembly. The term "electronic locking assembly" is broadly intended to encompass electro-mechanical locks with a bolt that is movable between a locked and unlocked position electronically and/or mechanically, including but not limited to, single cylinder, double cylinder, and vertical deadbolts.

In the example shown in FIG. 1, the locking assembly 100 includes an interior assembly 106, a latch assembly 104, and an exterior assembly 102. Typically, the interior assembly 106 is mounted on the inside of a door (not shown), while the exterior assembly 102 is mounted outside of the door (not shown). The latch assembly 104 is typically mounted in a bore hole (not shown) formed in the door. The term "inside" is broadly used to denote an area inside a door and "outside" is also broadly used to mean an area outside a door. For example, with an exterior entry door, the interior assembly 106 may be mounted inside a building and the exterior assembly 102 may be mounted outside a building. In another example, with an interior door, the interior assembly 106 may be mounted inside a room to be secured by the locking assembly 100 located inside the secured room, and the exterior assembly 102 may be mounted outside the secured room. The locking assembly 100 is applicable to both interior and exterior doors. The locking assembly 100 may also be used in such a way to secure any room with the interior assembly 106 located on the inside of the room and the exterior assembly 102 located on the outside of the room. The locking assembly 100 may also be used in a way where the interior assembly 106 is located outside a door and the exterior assembly 102 is located inside the door.

In the embodiment shown, the exterior assembly 102 is in communication with the interior assembly 106 and latch assembly 104 for electronically unlocking/locking the locking assembly 100. In some embodiments, the exterior assembly 102 can be used to receive and communicate with an electronic key to a control circuit (not shown) in the exterior assembly 102 for authentication, such as through a keypad 108, a biometric sensor (not shown), wirelessly, etc.

The latch bolt 120 moves linearly in and out of a barrel 122. When the latch bolt 120 is in a retracted position, the end of the latch bolt 120 is generally flush with a faceplate 124. When the latch bolt 120 is in an extended position, the latch bolt 120 protrudes through an opening of a faceplate 124, which is positioned in a jamb adjacent the door. A retracted position is broadly used to denote an "unlocked" position and an extended position is broadly used to denote a "locked" position.

The locking assembly 100 includes an exterior assembly 102 including a keypad 108. In use, a user enters a predetermined passcode at the keypad 108, which functions to unlock the door. Entering a passcode at the keypad 108 may unlock the door itself. Alternatively, to unlock the locking assembly, an additional step of using a mechanical key may be required.

In an alternative embodiment, a biometric sensor is used instead of a keypad 108. For example, a resident of a home may have a fingerprint stored within the biometric control system. The user moves a finger across the sensor, and the sensor transmits the sensed fingerprint to a control circuit. The control circuit compares the sensed fingerprint to a stored fingerprint, and may allow access into the building if the sensed fingerprint matches the stored fingerprint.

In yet another embodiment a keypad is not present. A user may use an RFID tag that allows the motor to actuate when the correct RFID tag is detected. In further embodiment, alternative methods of electronically communicated with the motor are contemplated.

The locking assembly 100 further includes an actuating mechanism 112, for example a lever or handle. In an example embodiment, the actuating mechanism 112 is selectively engaged with a lock cylinder 110. In an embodiment, the lock cylinder 110 accepts a mechanical key, which may be used in combination with the passcode, or alternatively, may be used instead of entering the passcode.

Figure 2:
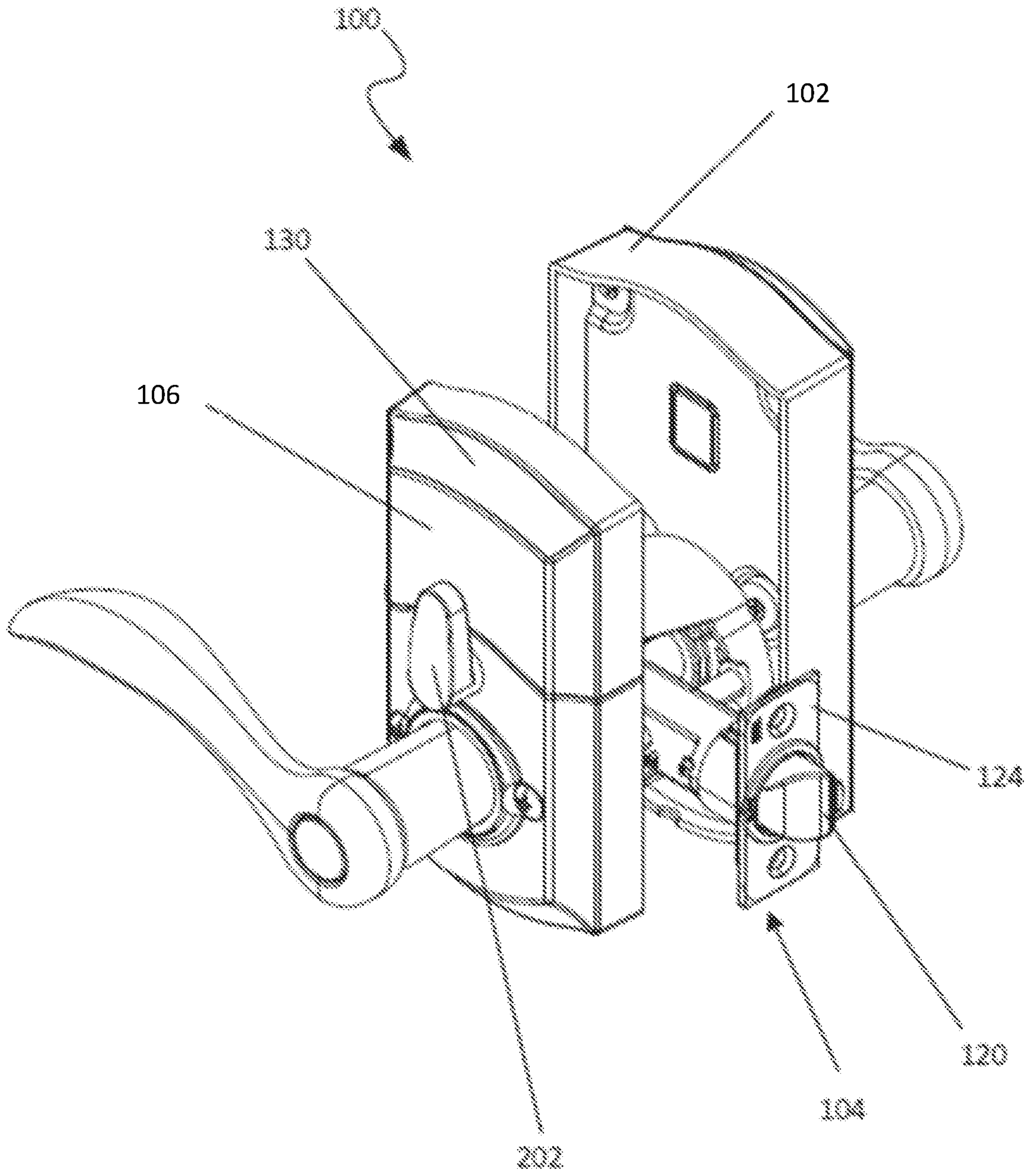
FIG. 2 shows a perspective view of an interior portion of the locking assembly.

In the example shown in FIGS. 1 and 2, the interior assembly 106 includes an interior rose 130 that houses internal components of the interior assembly 106. The exterior assembly 102 has an exterior rose 132 that houses the exterior assembly 102. As shown, the exterior rose 132 has a decorative rectangular shape, but round, square, and other shapes for the exterior rose 132 are within the scope of the disclosure. The interior rose 130 and exterior rose 132 could be formed from metal or plastic depending on the circumstances. In the example shown, the exterior rose 132 defines an opening through which buttons 118 of a keypad 108 is accessible.

A keypad 108 with a plurality of buttons 118 extend through the exterior rose 132 in the example shown. The buttons 118 may be used to enter a passcode for unlocking the locking assembly 100 or otherwise control operation. The keypad 108 has a plurality of touch areas that use touch to function as buttons 118 for entering a passcode for unlocking the locking assembly 100 or otherwise controlling operation. For example, the keypad 108 could use a capacitive touch circuit. In the example shown, there are eight touch areas or buttons 118, but one skilled in the art should appreciate that there could be more than eight touch areas or less than eight touch areas depending on the circumstances. For example, touch areas could be used for multiple passcode inputs, such as touching a button once for "1" and twice for "2," etc. In this example, the keypad 108 does not have mechanical keys, but has touch areas or buttons 118 on the keypad 108 that allow an uninterrupted surface for the keypad 108. Although a keypad 108 with buttons 118 is shown for purposes of example, other input devices could be used, including but not limited to a touch screen, biometric sensor, microphone, etc.

A mechanical key (not shown) may be inserted into the lock cylinder 110 to mechanically unlock the locking assembly 100. Accordingly, in the embodiment shown, the exterior assembly 102 may be used to unlock the locking assembly 100 electronically using the keypad 108, and mechanically using a mechanical key, or electronically using the keypad 108 alone.

The latch assembly 104 is disposed in a core in the door (not shown) and may be actuated manually by the actuating mechanism 112 to extend and retract a latch bolt 120. The latch bolt 120 moves linearly in and out of a barrel 122. When the latch bolt 120 is retracted, an end of the latch bolt 120 is generally flush with a faceplate 124. When the latch bolt 120 is extended, the latch bolt 120 protrudes through an edge bore in the door into an opening of a strike plate (not shown), which is positioned in a jamb adjacent the door. As is typical, the strike plate is attached to the jamb using fasteners.

FIG. 2 shows the interior assembly 106 of the locking assembly 100, the interior assembly 106 includes a housing that defines a recessed area for internal components of the interior assembly 106. In an embodiment, the interior assembly 106 includes an internal deadbolt (not shown). The internal deadbolt is connected to an interior deadbolt lever 202, which can be actuated by a user. When the interior deadbolt (not shown) is actuated, the door cannot be opened, regardless of whether the correct digital passcode and/or key are entered.

The interior assembly 106 has an interior rose 130 that houses the interior assembly 106. As shown, the interior rose 130 has a decorative rectangular shape, but round, square, and other shapes for the interior rose 130 are within the scope of the disclosure. The interior rose 130 and exterior rose 132 could be formed from metal or plastic depending on the circumstances. In the example shown, the exterior rose 132 defines an opening through which the interior deadbolt lever 202 is accessible.

Components described herein as being in the exterior assembly 102 or interior assembly 106 should not be seen as limited. Components may alternatively be located in either assembly.

Figure 3:
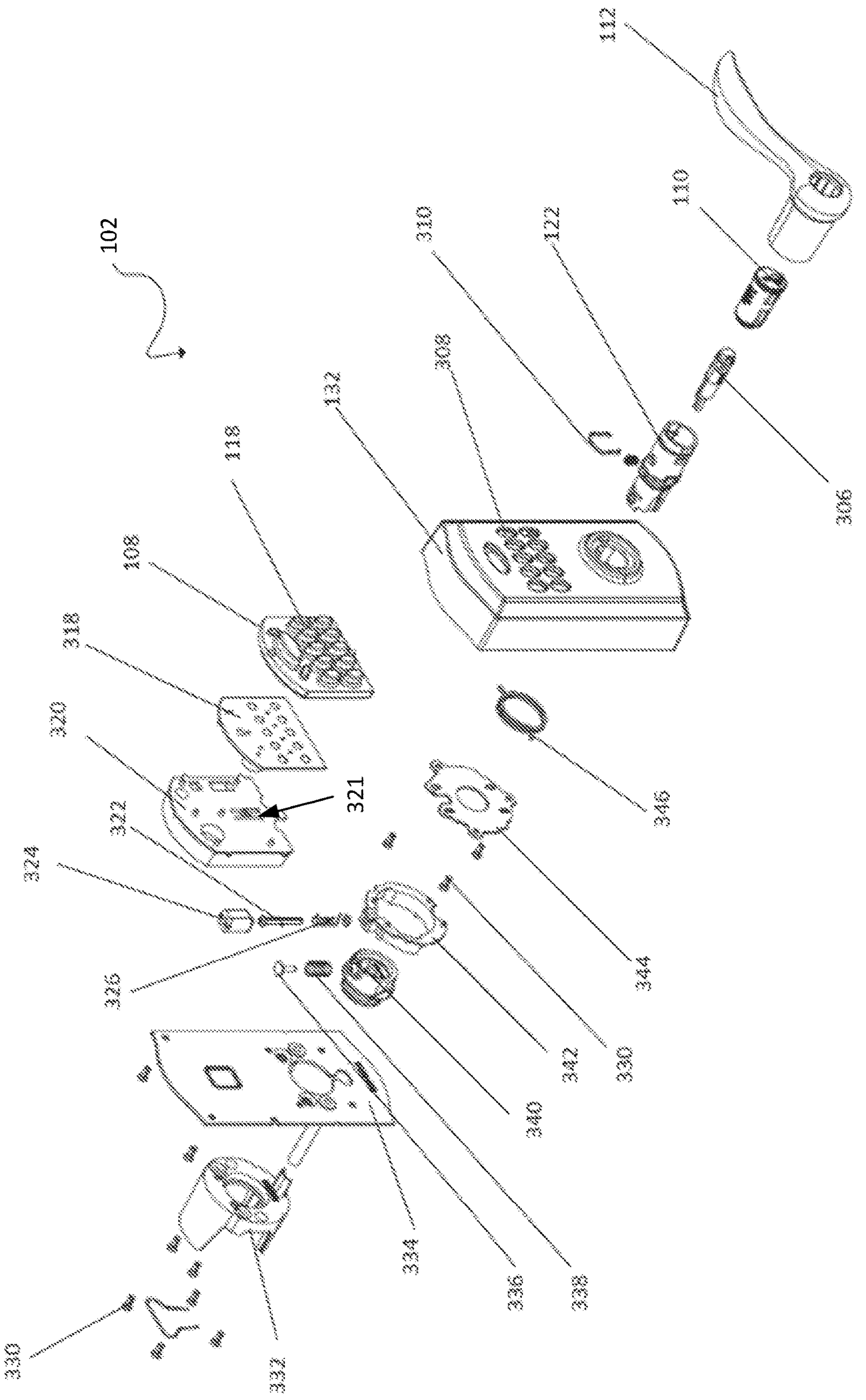
FIG. 3 show a partially exploded perspective view of the internal mechanisms of the exterior portion of the locking assembly.

FIG. 3 is exploded view of the internal components of the exterior assembly 102 according to the embodiment shown in FIG. 1. The locking assembly 100 includes an exterior rose 132 (also referred to herein as an external faceplate) which includes a plurality of holes 308 to receive the buttons 118 of the keypad 108. In an alternative embodiment, the keypad may be a touch panel configured to receive a fingerprint or other similar input mechanism.

The keypad 108 may be made from a variety of materials that are waterproof, such as plastics, rubber, or other similar materials. Further, the connection between the holes 308 of the exterior rose 116 and the buttons 118 comprises a seal to prevent water from penetrating the internal components of the locking assembly 100.

As the rear surface of the keypad 108 and control circuit 318 is generally flat, keypad 108, control circuit 318, and control circuit housing 320 rests flush against the door with supports extending into a pocket (not shown) within the door. As the control circuit housing 320 is flush against the exterior side of the door, this provides an added security feature preventing an unauthorized user from using a pry bar between the keypad 108 and the door.

Control circuit 318 is a printed control circuit configured to receive the touch input of the keypad 108. When control circuit 318 receives the correct input, control circuit 318 sends an unlock signal to the motor 324. Motor 324 is operatively coupled to a spindle 322 and is configured to rotate spindle 322 around a first axis. Rotation around the first axis may be in both a clockwise and counterclockwise direction. In an example, when motor 324 receives an unlock signal, motor rotates the spindle 322 in a clockwise direction, and when motor 324 receives a lock signal, motor rotates the spindle 322 in a counter clockwise direction.

In yet another embodiment, the motor 324 may automatically rotate the spindle 322 in a counter clockwise direction to lock the locking assembly 100 after a predetermined period of time. For example, the motor 324 may lock the locking assembly 100 after 10 seconds, 15 seconds, or other period of time.

Motor 324 is operatively connected to spindle 322, which is operatively connected to a first spring 326. Spindle 322 and first spring 326 are described in more detail below with regard to FIG. 4A. Spindle 322 is a rod-shaped mechanism oriented around a first axis, for example, vertically within the locking assembly 100. Spindle 322 is capable of rotational motion along the first axis. Spindle 322 includes a first end having a recess that is connected to the motor. Spindle 322 also includes a lateral projection 404 (shown in FIG. 4A) to engage with a first spring 326. When spindle 322 is actuated, recess turns, causing the position of the first spring 326 to change relative to the lateral projection along the first axis between a neutral position and a biasing position. For example, the first spring may move in a downward direction along the spindle, away from the motor and toward the flange 342.

First spring 326 is operatively engageable with the movable flange 342. First spring 326 and spindle 322 are located above movable flange 342 within exterior assembly 102.

Residing within movable flange 342 is a pin 336. Pin 336 is configured to be engageable with a recess 422 of coupling 340 and a recess 423 of the barrel 122 when aligned and to lock rotation thereof. Pin 336 is a t-shaped pin that comprises a head and a shaft extending therefrom as shown in more detail in FIG. 4B. A second spring 338 extends around shaft of pin 336. In a disengaged position, second spring 338 is slightly compressed. In an engaged position, second spring 338 is compressed by movable flange 342 and head of pin 336. When second spring 338 is in a disengaged position, pin 336 remains outside of the recess 423 of the barrel 122 and/or the recess 422 of the coupling 340.

When first spring 326 is in a neutral position, the first spring 326 is engageable with movable flange 342, wherein movable flange 342 is in a first position. When first spring 326 is in a biasing position, first spring 326 is engageable with movable flange 342, wherein movable flange 342 is in a second position and pin 336 is located in recess 422 of coupling 340 and the recess 423 of the barrel 122.

A c-clip 310 and a single coil spring 346 are also shown. The single coil spring 346 and c-clip 310 aid in coupling the lock cylinder 110, torque blade assembly 306, barrel 122, and coupling 340 to exterior assembly 102. The lock cylinder 110 and torque blade assembly 306 and both are retained within the barrel 122 by the c-clip 310. Optionally, the lock cylinder 110 can be replaceable by removal of the c-clip 310, replacement of the lock cylinder 110, and re-insertion of the c-clip 310. The lock cylinder 110, barrel 122, and coupling 340 are affixed to each other and rotatable as discussed in further detail below.

Coupling 340, barrel 122, torque blade assembly 306, and lock cylinder 110 are collectively referred to as a locking cylinder assembly. Locking cylinder assembly resides at least partially in actuating mechanism 112 and into interior of exterior assembly 102. In an embodiment, lock cylinder 110 and torque blade assembly 306 reside in barrel 122. Barrel 122, lock cylinder 110, and torque blade assembly 306 extend within coupling 340 and flange 342.

The buttons 118 extend from a control circuit 318 that transmits electrical signals based on user actuation of the keypad 108 to a controller in the exterior assembly 102 using a wiring harness (not shown). In some cases, a wedge may be provided to fill and dampen any gap between the exterior rose 132 and the control circuit 318. In this example, a plurality of fasteners 330 secure the back plate 334 and control circuit 318 to the exterior rose 132. As shown, holes in the back plate 334 are aligned with holes in the control circuit 318 and fasteners 330 extending therethrough. In the embodiment shown, the control circuit 318 includes an opening that is aligned with a recess of the control circuit 318, which allows wiring to extend therethrough.

As shown, a plurality of fasteners 330 secure a portion of the chassis 332 and the back plate 334 to the exterior rose 132. In the embodiment shown, holes in the back plate 334, control circuit 318, and keypad 108 are aligned with threaded openings in the rear portion of the exterior rose 132.

Figure 4B:
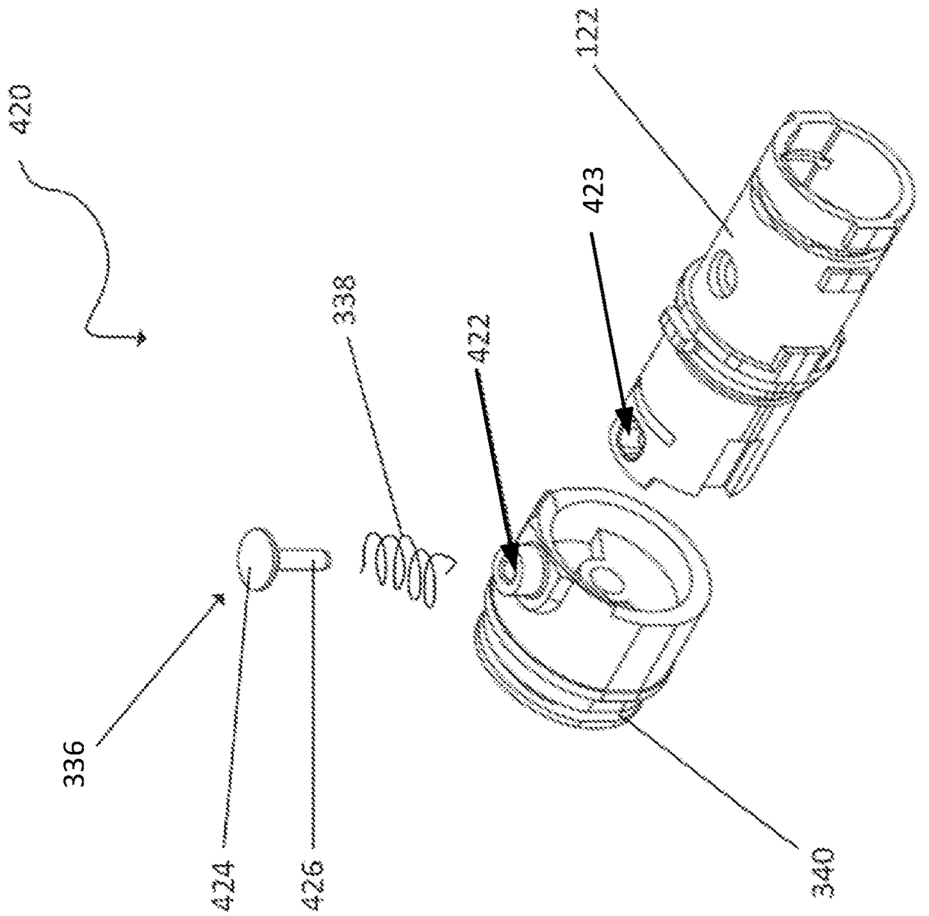
FIG. 4*b* illustrates a perspective view of a connection pin, coupling, and lock cylinder according to an example embodiment of the locking assembly.
Figure 4A:
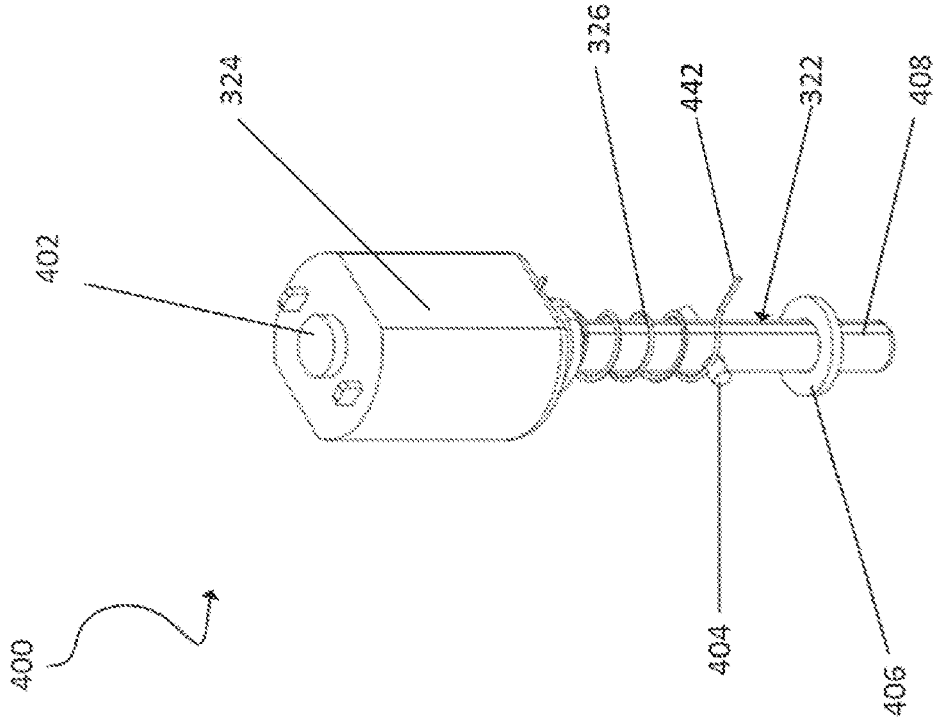
FIG. 4*a* illustrates a perspective view of a motor and spindle assembly according to an example embodiment of the locking assembly.

FIG. 4A illustrates an example embodiment of a motor and spindle combination 400. As shown, motor 324 is operatively connected to spindle 322, which extends from motor 324. For example, spindle is positioned to rotate around a first axis, the first axis being positioned vertically. It should be noted that although components are described with reference to direction, other orientations of the components are contemplated. Motor 324 includes an electrical connection 402 at an end opposite the spindle 322, which allows for motor 324 to connect to control circuit 318 to receive lock and unlock signals.

Spindle 322 includes an elongate body 408, a lateral projection 404, and a washer 406. A first spring 326 is wrapped around the body 408 and is operatively connected to the lateral projection 404. Washer 406 provides a connection surface to contact coupling 340. In use, when motor 324 actuates spindle 322, the lateral projection 404 rotates to move first spring 326 along spindle 322 from a neutral position to a biasing position. When motor 324 receives a lock signal from control circuit 318, motor 324 rotates spindle 322 in an opposing direction to cause first spring 326 to move in an opposing direction.

FIG. 4B illustrates an example embodiment of a coupling and pin combination 420. Pin 336 includes a head portion 424 and a shaft 426 extending from a surface of the head portion 424. A second spring 338 having a first end 440 and a second end 442 is located around shaft 426 of pin 336. Second spring 338 is held in position by head portion 424 of pin 336 and body of coupling 340. In a disengaged position, second spring 338 is not compressed and pin 336 remains outside the recess 423 of the barrel 122, the pin 336 is biased toward the disengaged position by the second spring 338. In an engaged position, second spring 338 is compressed by head portion 424 of pin 336, and pin 336 resides within the recess 422 and the recess 423.

The first spring 326 has a first leg (not shown) at a first end and a second leg at a second end. The first leg and the second leg are coupled to an elongated slot 321 of the control circuit housing 320. The first spring 326 may be restricted from rotating via the slot 321. The second leg may also act as a ramp that allows the lateral projection 404 to engage and disengage the first spring 326 when the motor is actuated in either a clockwise direction or a counterclockwise direction.

Coupling 340 includes a round body positioned along a second axis. For example, the second axis may be located horizontally. Coupling 340 includes a recess 422 along a surface of the body. The recess 422 is sized to accept the shaft 426 of the pin 336. Coupling 340 is operatively connected to barrel 122. Both coupling 340 and barrel 122 are axially stationary, but rotationally movable.

Figure 5:
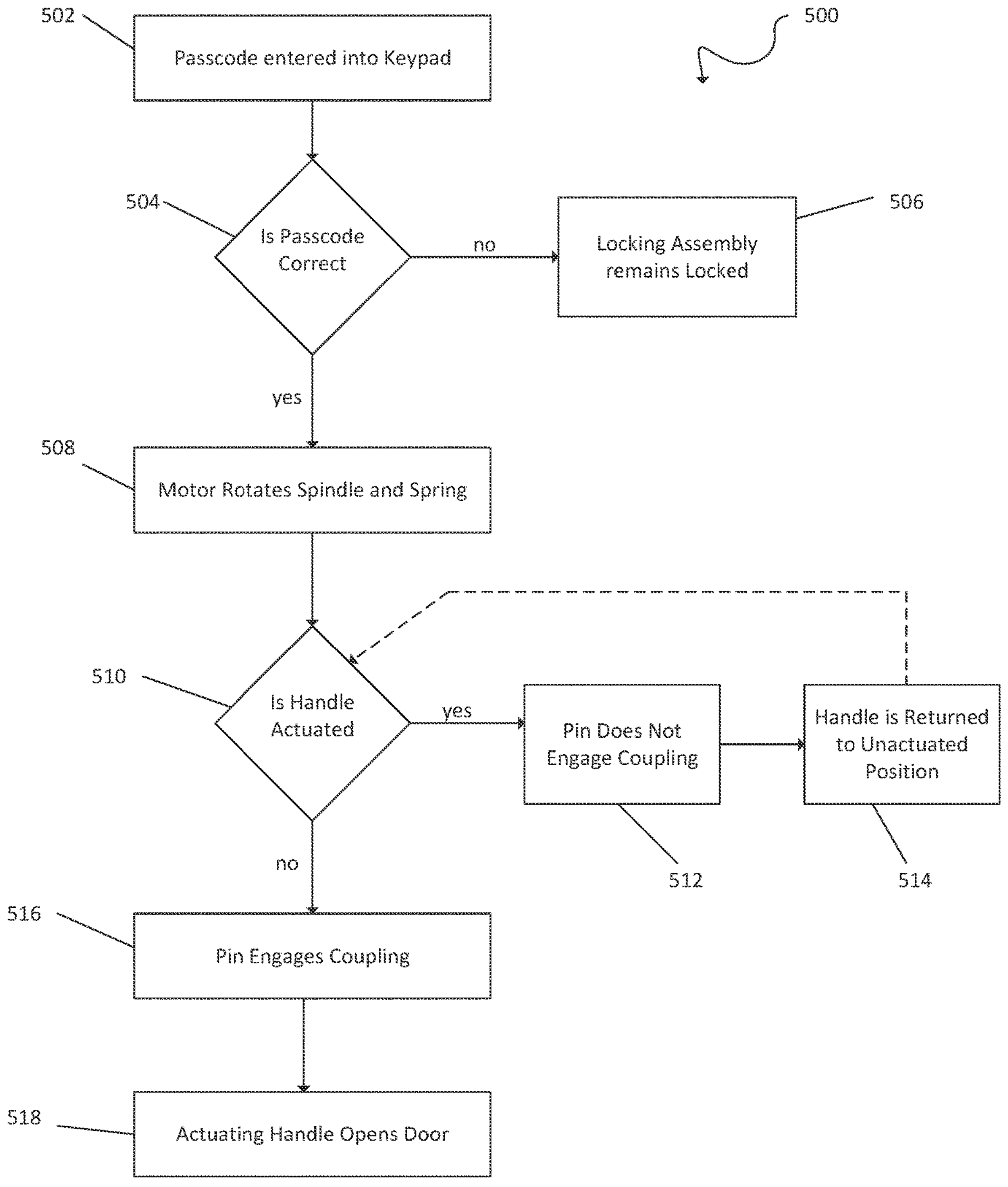
FIG. 5 illustrates an example method of actuating the locking mechanism.

FIG. 5 illustrates an example flowchart 500 of how locking assembly 100 is used to lock and unlock a door. At a first step 502, an electronic passcode is entered at the keypad by a user. At 504, it is determined if the passcode is correct. If the electronic passcode is incorrect then the motor does not actuate and the door is not able to be opened. When the passcode is incorrect, the locking assembly remains locked 506. If the electronic passcode entered into the keypad is correct, the process moves to the next step 508. At step 508, the motor 324 receives an unlock signal from the control circuit so the motor 324 rotates the spindle 322 and corresponding first spring 326. It should be noted that through the specification, a keypad 108 is used as receiving an electronic passcode, but alternative methods may be used to input a "passcode," such as an RFID tag, biometric sensor, or other similar technologies.

At step 510, it is determined if the actuating mechanism 112, for example a handle, has been actuated, meaning the user has turned the handle. If the handle has already been actuated, then the pin 336 is not able to engage the coupling 340 at step 512. If the handle is actuated before the electronic passcode has been received by the locking assembly 100, the user is not able to open the door because the pin 336 cannot engage the coupling 340. In this situation the user is not able to open the door until the handle has returned to an unactuated (or neutral) position at step 514, at which time, the pin 336 engages the coupling 340 and the door is able to be opened at step 518.

At step 510, if the handle has not been actuated, then the pin 336 is capable of engaging the coupling 340 at step 516. When the pin 336 is engaged with the coupling 340, the handle is actuated by the user, and the door is able to be opened at step 518.

The sequence of events provides a two-step process to unlocking a door. First, the electronic passcode must correctly be entered in the keypad. Second, the actuating mechanism, for example a handle, must be actuated by a user. Even if the handle has been actuated before the electronic passcode is entered in the keypad the door is still able to be opened only after the user has just returned the handle to the unactuated (or neutral) position and actuated the handle a second time.

In an example embodiment, the handle is not able to be actuated if a mechanical key has not been entered into the lock cylinder. Alternatively, if the correct electronic passcode is not entered into the keypad, the door is not able to be unlocked regardless of whether the unit user has actuated the handle or not (with or without a mechanical key).

The locking assembly 100 can be subsequently locked by closing the door and allowing the actuating mechanism 112 to return to an unactuated (or neutral) position. In an embodiment, the motor 324 automatically rotates the spindle 322 in an opposing direction after a predetermined amount of time, which moves the first spring 326 away from the movable flange 342 to a neutral position. Then, when the actuating mechanism 112 is returned to an unactuated (or neutral) position, the pin 336 is biased toward the disengaged position (outside the recess 423 and/or the recess 422) by the second spring 338 and the locking assembly 100 is locked.

Alternatively, the locking assembly 100 may require the electronic passcode to be re-entered to lock the door. When the control circuit 318 receives the correct electronic passcode, it sends a lock signal to the motor 324. The motor 324 rotates the spindle 322 in an opposing direction, which moves the first spring 326 upwards away from the movable flange 342. Then the movable flange 342 returns to the neutral position, and when the actuating mechanism 112 is actuated back to the unactuated position, the pin 336 is pushed out of the recess 423 and/or the recess 422 by the second spring 338. This causes the locking assembly 100 to return to a locked state.

Figure 6:
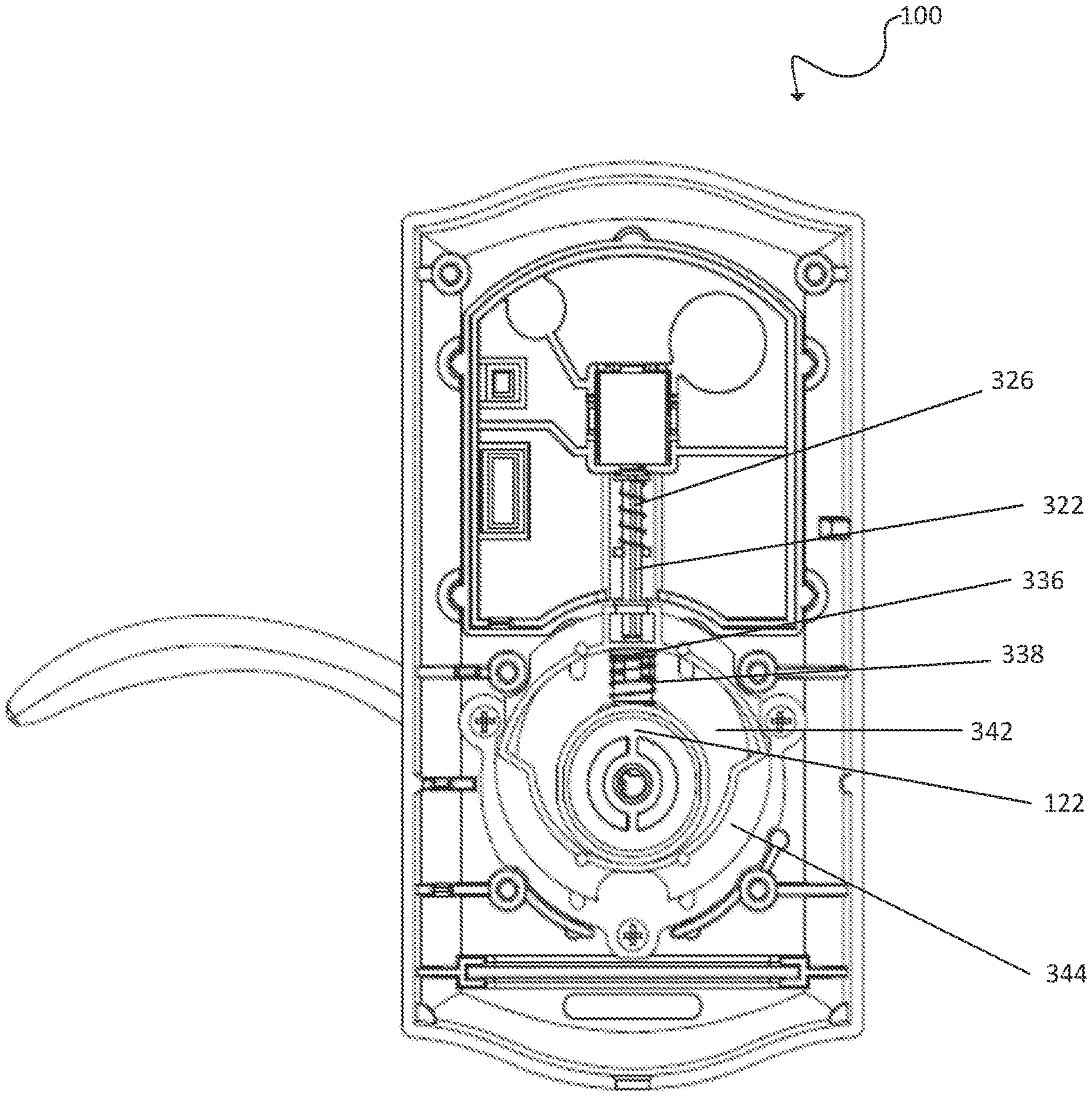
FIG. 6 illustrates a perspective view of the internal mechanisms of a locking assembly in a locked position.

FIG. 6 illustrates the internal mechanisms of the locking assembly 100 in a locked state. As shown, in the locked state, the first spring 326 is located at the top of the spindle 322. The first spring 326 is located in a neutral position, the pin 336 is in a disengaged position, and the flange 342 is in a first position. The first spring 326 is not contacting the movable flange 342. The movable flange 342 is resting atop the pin 336, and is not compressing the pin 336. The second spring 338 is in a relaxed state, which maintains pin 336 from entering recess of coupling 340.

As shown, the movable flange 342 is located relatively high compared to adapter 344. The actuating mechanism 112 is not actuated and is in a neutral position.

Figure 7:
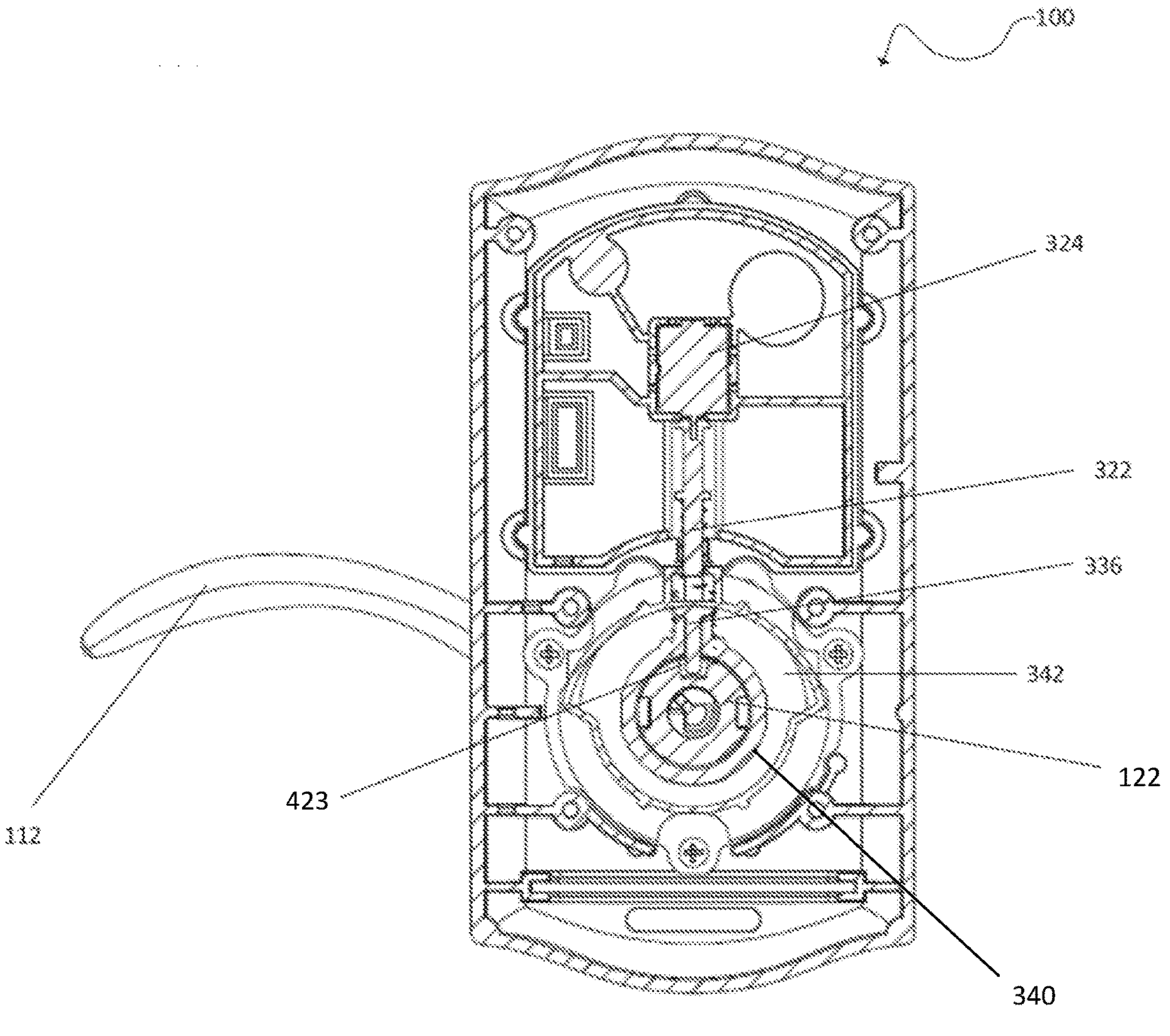
FIG. 7 illustrates a perspective view of the internal mechanisms of a locking assembly in an unlocked position.

FIG. 7 illustrates the internal mechanisms of the locking assembly 100 in an unlocked state. The unlocked position is attained by having a correct electronic passcode entered into the keypad (not shown). Once the motor 324 has received an unlock signal, the motor 324 rotates the spindle 322, which moves the first spring (not shown). When the spindle 322 moves the first spring it becomes slightly compressed, which causes the movable flange 342 to be in a second position, because the first spring 326 is in a biasing position. The movable flange 342 compresses the pin 336, and the pin 336 is within the recess 423 of the barrel 122.

As shown, the movable flange 342 is located lower compared to adapter 344. The actuating mechanism 112 is not actuated and is in a neutral position.

Figure 8:
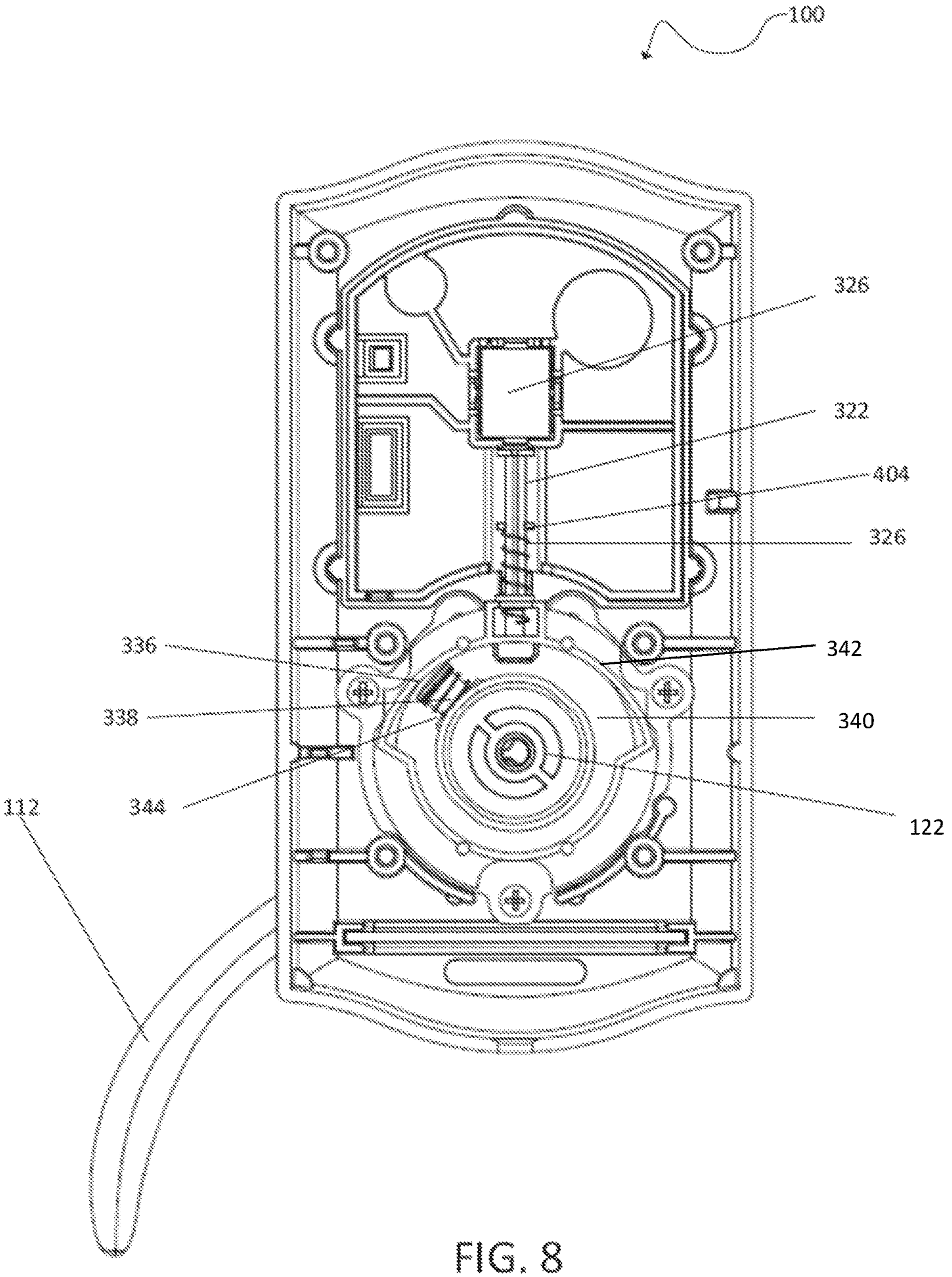
FIG. 8 illustrates a perspective view of the internal mechanisms of a locking assembly in an unlocked position with the handle in an actuated position.

FIG. 8 illustrates the internal mechanism of the locking assembly 100 in an unlocked state while the actuating mechanism 112 is actuated. As shown, the first spring 326 has been rotated along the spindle 322 by the motor 324. The first spring 326 causes the movable flange 342 to be in a second position, which causes the pin 336 to be within the recess 423 of the barrel 122. Once the pin 336 is engaged within the recess 423, actuating the actuating mechanism 112 rotates the coupling 340 and the pin 336 along the horizontal axis.

Figure 9:
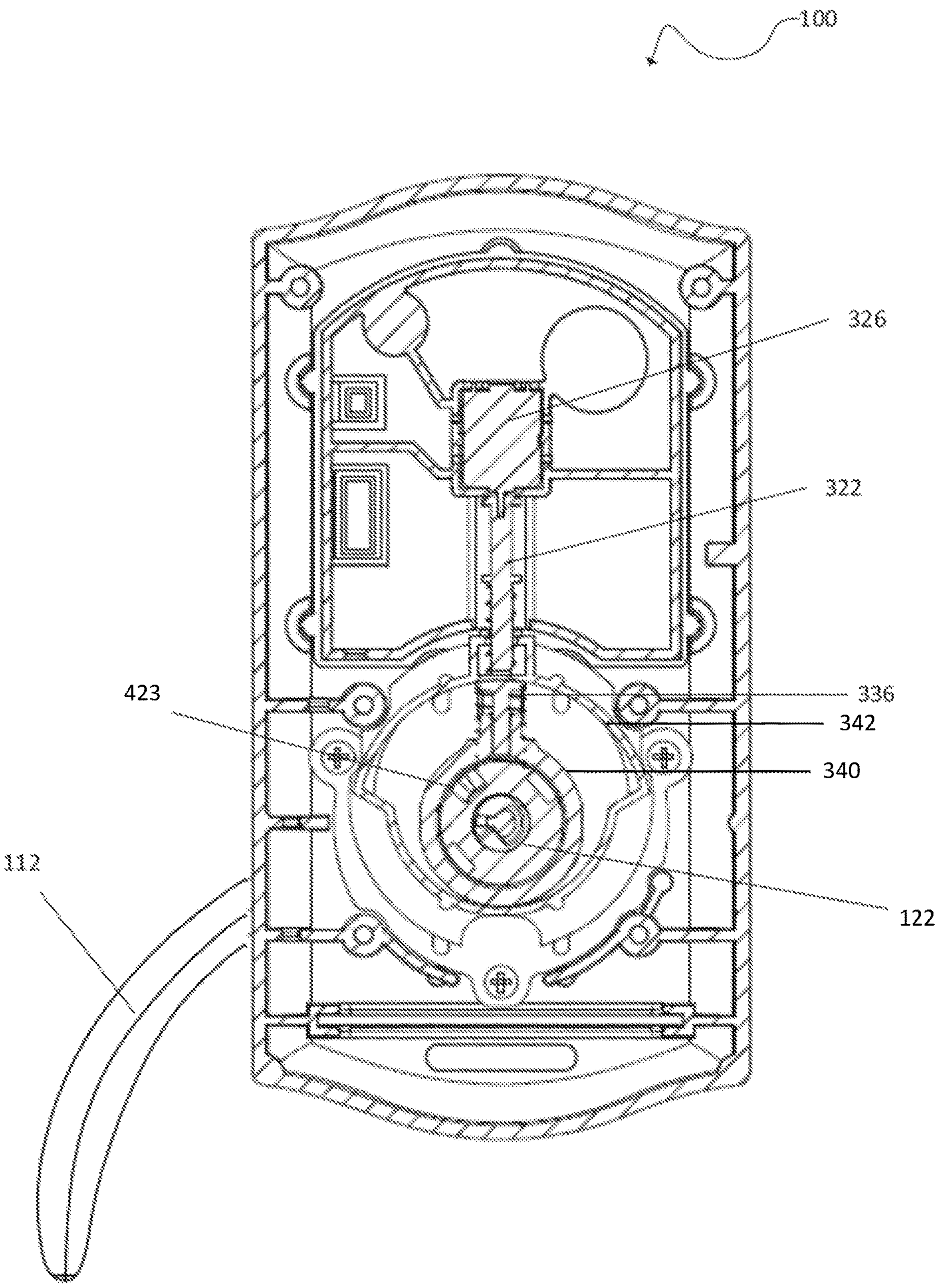
FIG. 9 illustrates a perspective view of the internal mechanisms of a locking assembly in a locked position with the handle in an actuated position.

FIG. 9 illustrates the internal mechanism of the locking assembly 100 in a locked state while the actuating mechanism 112 is actuated. As shown, in the locked state, the first spring 326 has not been rotated along the spindle 322. The first spring 326 is not contacting the movable flange 342. The movable flange 342 is resting atop the pin 336, but is not compressing the pin 336. The second spring 338 is in a disengaged position, which maintains the pin 336 from entering recess of coupling 340.

When the actuating mechanism 112 is actuated, the coupling 340 is rotated along the second axis. However, since the locking assembly 100 is in a locked state, the pin 336 is not engaged in the recess 423 of the barrel 122. The door cannot be opened without the pin 336 being located within the recess 423 while the actuating mechanism 112 is being actuated.

Figure 10:
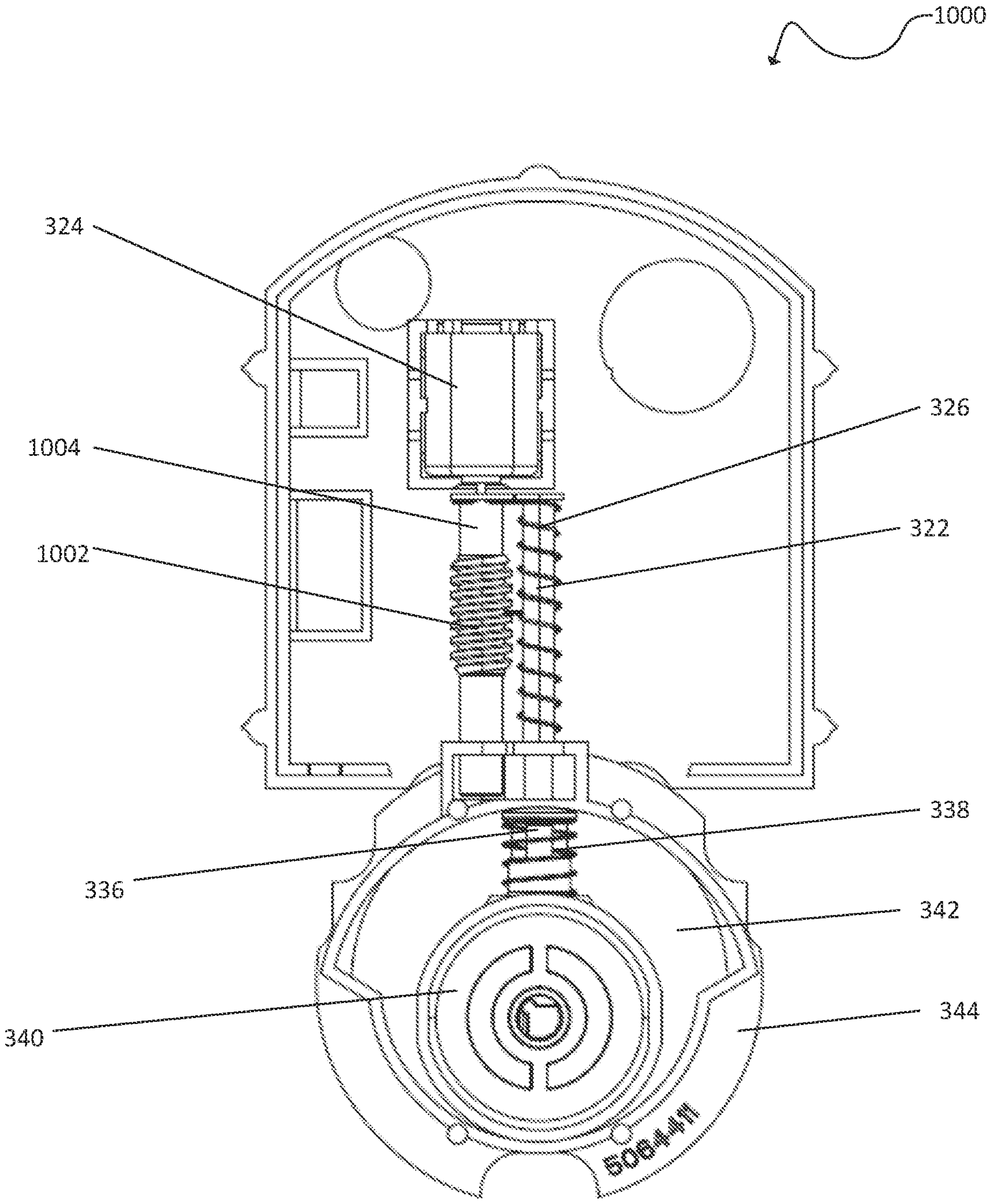
FIG. 10 illustrates a perspective view of the internal mechanisms of an alternative locking assembly in a locked position.

FIG. 10 illustrates the internal mechanisms of a locking assembly 1000 in a locked state according to another embodiment. As shown, in the locked state, the first spring 326 is located at the top of the spindle 322. The first spring 326 is engageable with gear teeth 1002 of second spindle 1004. Second spindle 1004 is actuatable by motor 324. When motor 324 receives an unlock signal from the control circuit, the motor 324 rotates the second spindle 1004, which rotates the gear teeth 1002. When gear teeth 1002 rotate, the first spring 326 rotates along spindle 322.

As shown, the first spring 326 is located in a neutral position, the pin 336 is in a disengaged position, and the flange 342 is in a first position. The first spring 326 is not contacting the movable flange 342. The movable flange 342 is resting atop the pin 336, and is not compressing the pin 336. The second spring 338 is in a relaxed state, which maintains pin 336 from entering recess of coupling 340. The movable flange 342 is located relatively high compared to adapter 344.

Figure 11:
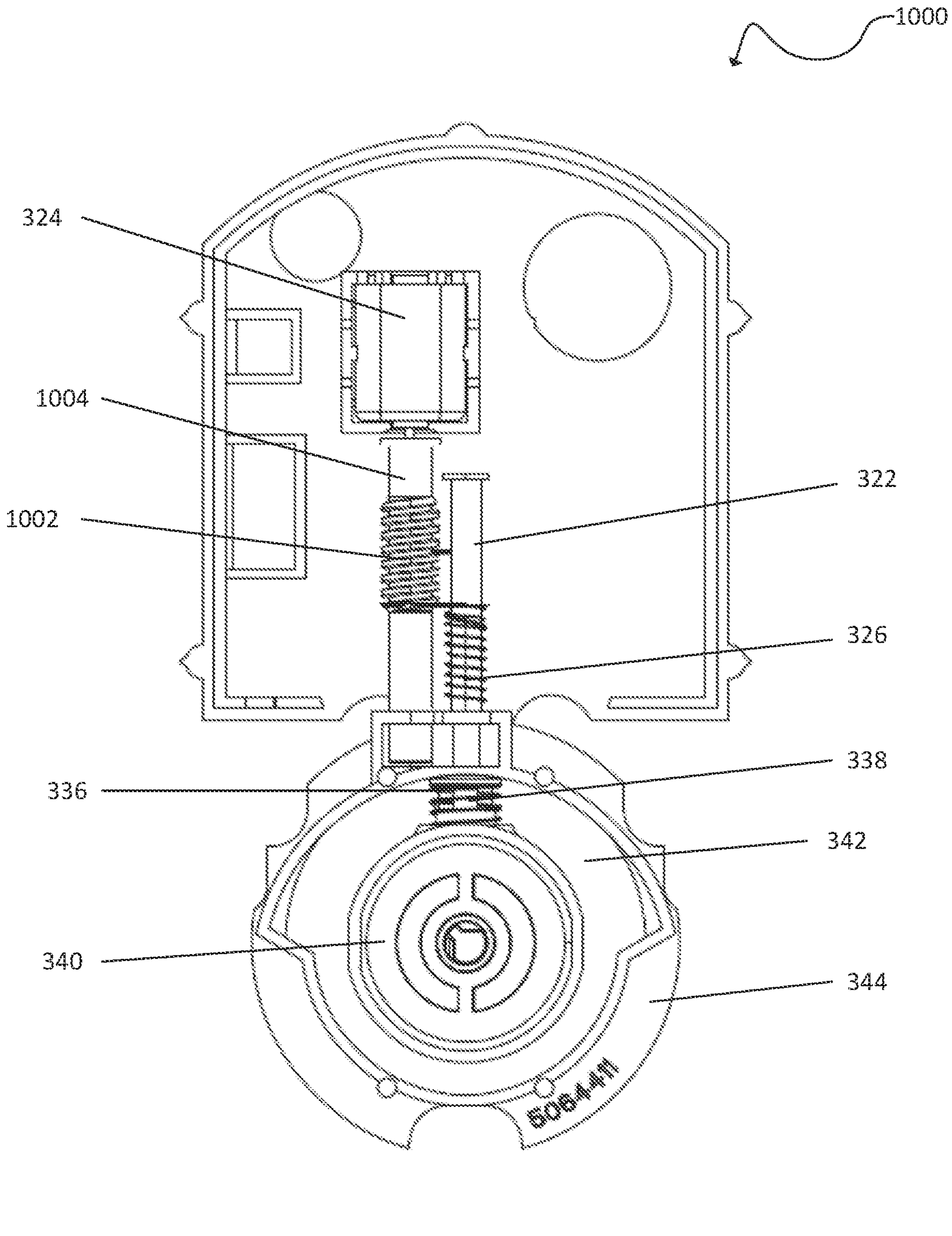
FIG. 11 illustrates a perspective view of the internal mechanisms of an alternative locking assembly in an unlocked position.

FIG. 11 illustrates the internal mechanisms of the locking assembly 1000 in an unlocked state. The unlocked position is attained by having a correct electronic passcode entered into the keypad (not shown). Once the motor 324 has received an unlock signal, the motor 324 rotates the second spindle 1004, which also rotates the gear teeth 1002. Gear teeth 1002 function to rotate first spring 326 along spindle 322 via a first leg engaging the first spring 326 to the gear teeth 1002, so the first spring 326 becomes slightly compressed. This causes the movable flange 342 to be in a second position, because the first spring 326 is in a biasing position. The movable flange 342 compresses the pin 336, and the pin 336 is within the recess 422 of the coupling 340 and the recess 423 of the barrel 122. The movable flange 342 is located lower compared to adapter 344. The actuating mechanism is not actuated and is in a neutral position.

Figure 12:
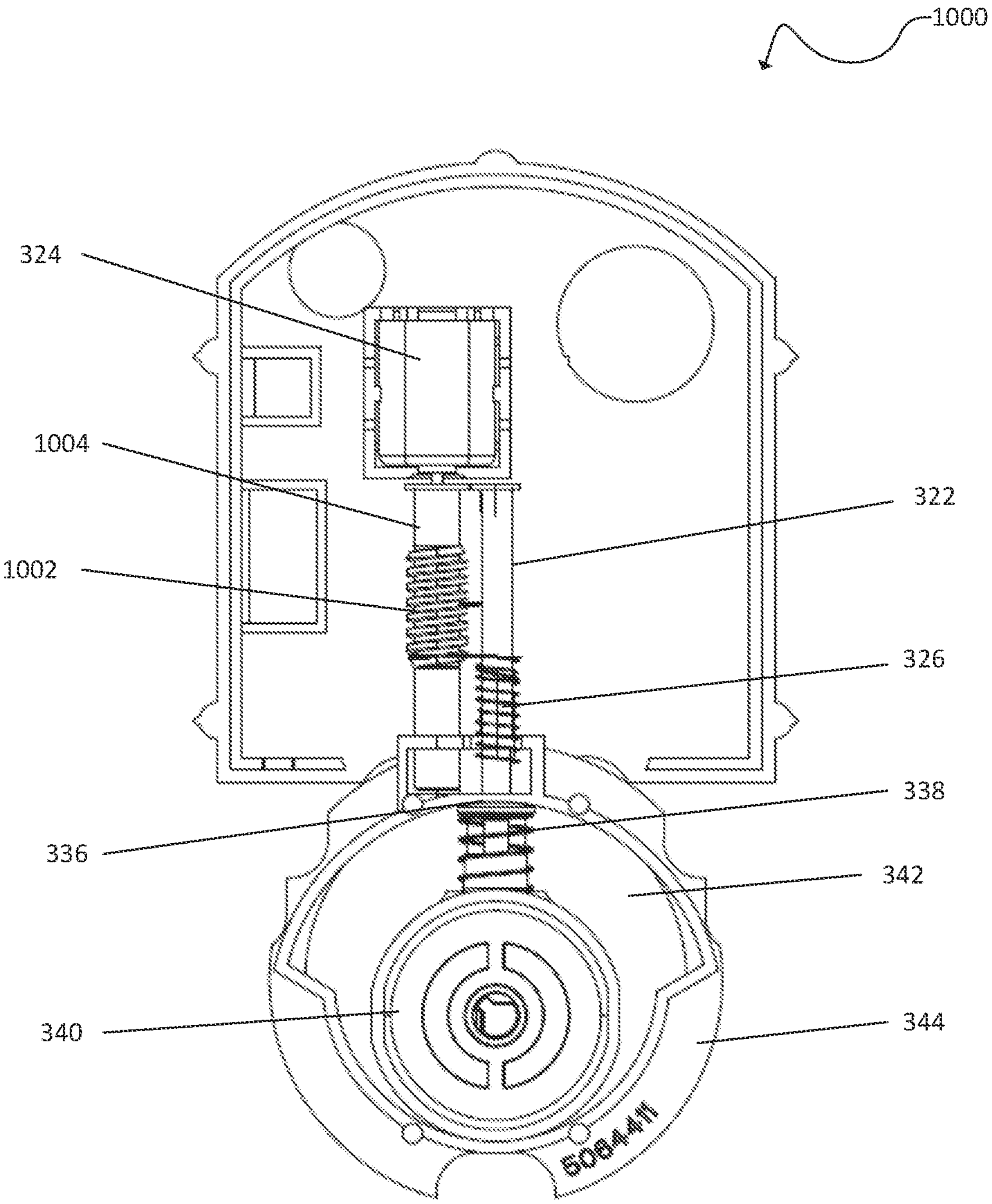
FIG. 12 illustrates a perspective view of the internal mechanisms of an alternative locking assembly in a locked position.

FIG. 12 illustrates the internal mechanism of the locking assembly 1000 in a locked state, even though the first spring 326 is attempting to compress the movable flange 342. In this embodiment, motor has received an unlock signal, so the motor 324 has rotated second spindle 1004, which rotates gear teeth 1002 to move first spring 326 down along spindle 322. Coupling 340 has been rotated by actuating mechanism (not shown), so pin 336 is not able to enter recess of coupling 340.

The movable flange 342 is resting atop the pin 336, but is not compressing the pin 336. When actuating mechanism (not shown) resumed an unactuated position, pin 336 is able to enter recess of coupling 340, and then the lock is able to be unlocked.

Figure 13:
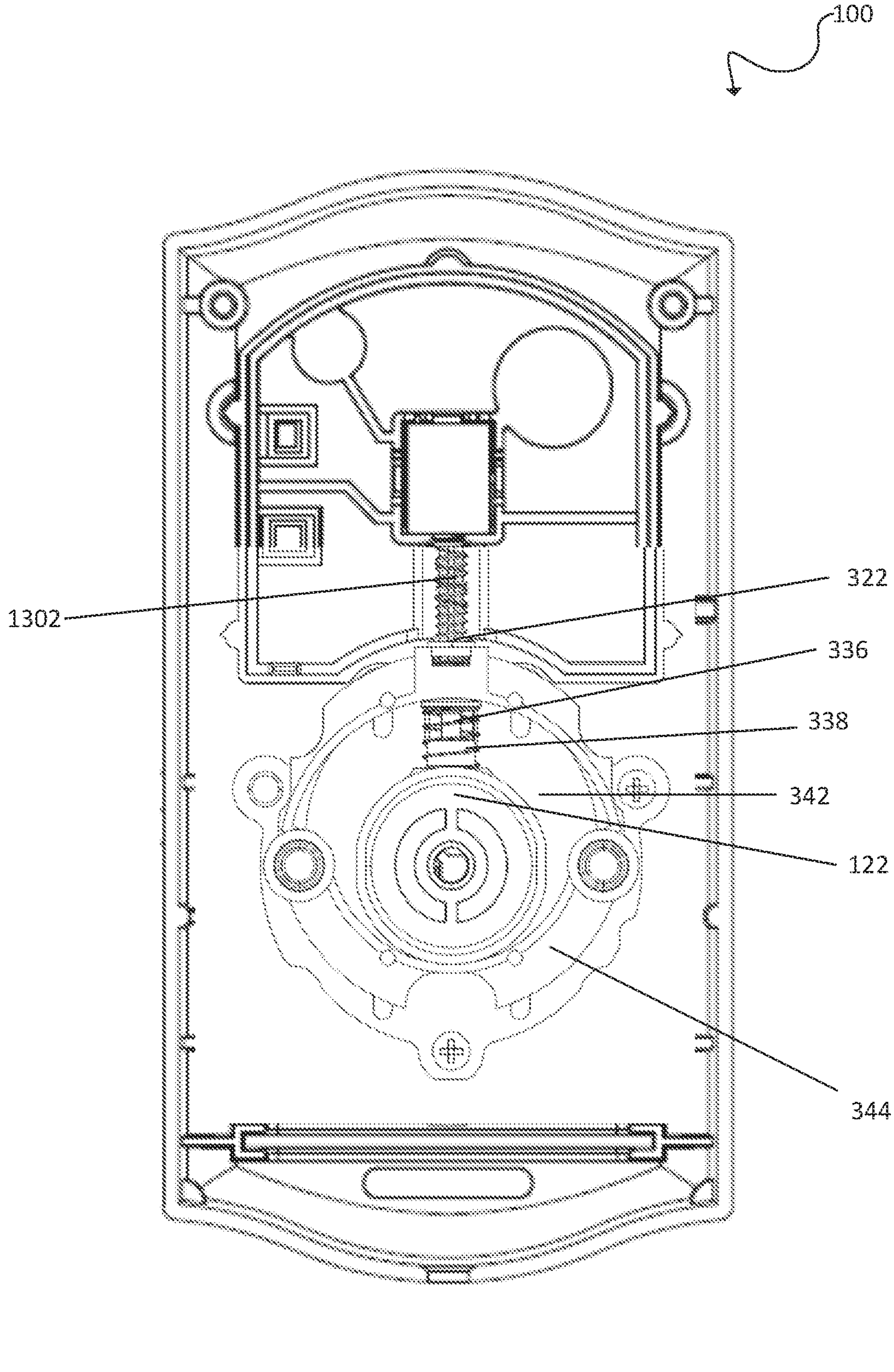
FIG. 13 illustrates a perspective view of the internal mechanisms of an alternative locking assembly.

FIG. 13 illustrates the internal mechanism of the locking assembly 100 in a locked state while the actuating mechanism (not shown) is not actuated. As shown, in the locked state, the spindle 322 has not been rotated, the pin 336 is in a disengaged position, and the flange 342 is in a first position. The spindle 322 includes gear teeth 1302, which may be a worm gear as part of a worm drive. The movable flange 342 is resting atop the pin 336, and is not compressing the pin 336. The second spring 338 is in a relaxed state, which maintains pin 336 from entering recess of coupling 340. As shown, the movable flange 342 is located relatively high compared to adapter 344. The actuating mechanism 112 is not actuated and is in a neutral position.

In the embodiment shown, spindle 322 includes gear teeth 1302 as part of a worm gear. Gear teeth 1302 are located on spindle 322. A worm drive functions to move movable flange 342 in a downward position with spindle 322 rotates and engages a worm of a second mechanism. In an embodiment, the gear teeth 1302 are located on the spindle 322, and the worm is located on movable flange 342. In an alternative embodiment, the gear teeth 1302 are located on the spindle 322, and the worm is located on the pin 336.

In yet another embodiment, the worm is located on the spindle 322, and the worm gear is located on movable flange 342. In a further embodiment, the worm is located on the spindle 322, and the worm gear is located on the pin 336.

Figure 14:
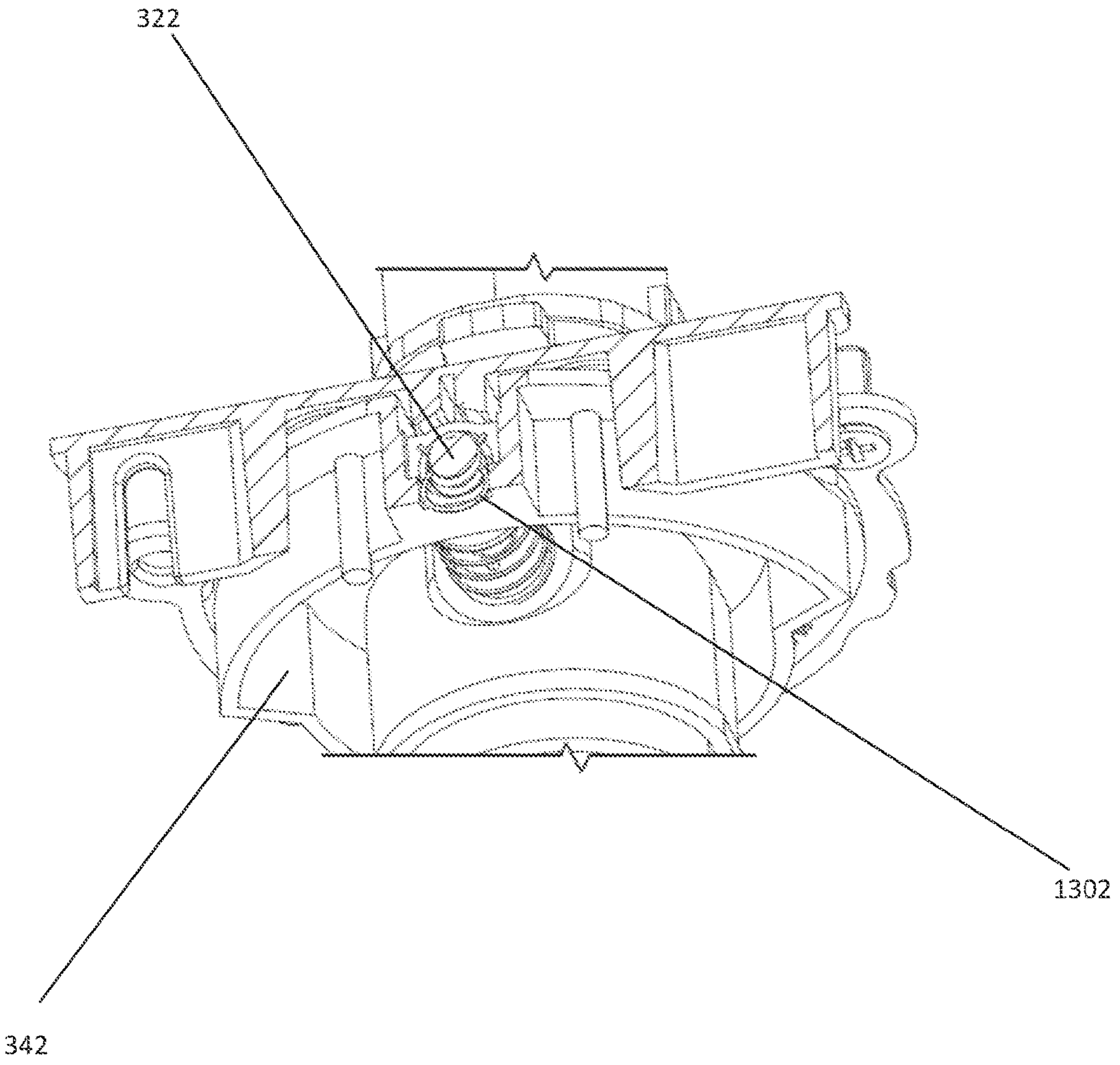
FIG. 14 illustrates a perspective view of the worm gear feature of FIG. 13.

FIG. 14 shows a top-down view of the worm drive. The gear teeth 1302 are located on the spindle 322. The second spring 338 is constrained within the movable flange 342. In an example, the gear teeth 1302 rotate, which moves worms of the moveable flange 342. Pin 336 moves with the movable flange 342 downward when the spindle 322 rotates.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. An electronic locking assembly comprising:

an actuation assembly selectively rotatable around a first axis;

a coupling disposed axially adjacent to a first end of the actuation assembly, the coupling supporting a pin biased in a radial direction relative to the first axis;

a flange at least partially surrounding the coupling with the pin, the entire flange selectively moveable in a linear sliding motion along a second axis, the second axis orthogonal relative to the first axis;

a spindle extending along the second axis and selectively rotatable around the second axis; and a spring coupled around the spindle, wherein upon rotation of the spindle, the spring slides along the spindle and along the second axis between at least a first position and a second position relative to the flange, and wherein in the first position, the spring urges the flange towards the coupling such that the pin engages with the first end of the actuation assembly and the coupling is rotatably coupled to the actuation assembly, and in the second position, the spring releases the flange such that the pin is allowed to disengage with the first end of the actuation assembly and the coupling is rotatably disengaged from the actuation assembly.

2. The electronic locking assembly of claim 1, further comprising a motor driving the selective rotation of the spindle.

3. The electronic locking assembly of claim 1, wherein the flange completely surrounds the coupling with the pin.

4. The electronic locking assembly of claim 1, wherein the actuation assembly includes a barrel selectively couplable to the coupling via the pin and an actuating mechanism.

5. The electronic locking assembly of claim 4, wherein the actuating mechanism includes a lock cylinder.

6. The electronic locking assembly of claim 1, wherein the actuation assembly includes a coil spring biasing a rotational position of the actuation assembly.

7. The electronic locking assembly of claim 1, wherein the spindle includes at least one projection engaging the spring.

8. The electronic locking assembly of claim 1, wherein the pin includes a head and a shaft, the shaft configured to engage with the coupling.

9. An electronic locking assembly comprising:

a latch assembly having a bolt configured to extend and retract therefrom;

a torque blade operatively coupled to the latch assembly and rotatable around a first axis; and a rose configured to mount on a door, the rose including:

an actuation assembly rotatably mounted on the rose and selectively rotatable around the first axis;

a coupling coupled to the torque blade, the coupling rotatably supported within the rose and disposed axially adjacent to a first end of the actuation assembly, the coupling supporting a pin biased in a radial direction relative to the first axis;

a flange moveably supported within the rose and at least partially surrounding the coupling with the pin, the entire flange selectively moveable in a linear sliding motion along a second axis, the second axis orthogonal relative to the first axis;

a motor disposed within the rose;

a spindle drivingly coupled to the motor, the spindle extending along the second axis and rotatable around the second axis; and a single spring coupled around the spindle, wherein the motor is configured to drive linear position of the single spring along the spindle so as to selectively engage the pin with the actuation assembly via movement of the flange such that the actuation assembly is coupled to the torque blade and operates the latch assembly.

10. The electronic locking assembly of claim 9, wherein the rose is an exterior rose.

11. The electronic locking assembly of claim 9, wherein the actuation assembly includes an actuating mechanism disposed outside of the rose.

12. The electronic locking assembly of claim 9, wherein the rose further comprises an interior housing supporting the motor, the spindle, and the single spring.

13. The electronic locking assembly of claim 9, wherein the actuation assembly is mounted to the rose via a coil spring and a c-clip.

14. The electronic locking assembly of claim 9, wherein the pin includes a head and a shaft, the head configured to engage with the flange.

15. The electronic locking assembly of claim 9, wherein a washer is disposed on a distal end of the spindle.

16. The electronic locking assembly of claim 9, wherein the coupling supports a biasing spring for the pin.

17. A method for operating an electronic locking assembly, the method comprising:

providing the electronic locking assembly in a locked configuration whereby an actuation assembly that is selectively rotatable around a first axis is disengaged with an axially adjacent coupling;

in response to an input, actuating a motor to rotate a spindle along a second axis, the second axis orthogonal to the first axis, the spindle extending along the second axis and having a spring coupled around the spindle; and upon rotation of the spindle, moving the spring from a first position towards a second position such that the spring urges a flange at least partially surrounding the coupling moves entirely in a linear sliding motion along the second axis towards the coupling such that a pin carried by the coupling engages with a first end of the actuation assembly and the coupling is rotatably coupled to the actuation assembly with the electronic locking assembly in an unlocked configuration.

18. The method of claim 17, wherein the unlocked configuration enables the actuation assembly to rotate a torque blade coupled to the coupling.

19. The method of claim 17, wherein the electronic locking assembly includes an exterior assembly housing the motor, the spindle, the spring, and the coupling, the input being received at the exterior assembly.

20. The method of claim 17, wherein the actuation assembly includes a handle, the method further comprises determining actuation of the handle.

* * * * *